United States Patent [19]

Rothon et al.

[11] Patent Number: 4,999,387

[45] Date of Patent: Mar. 12, 1991

[54] FILLED COHESIVE POLYMER MATRICES AND PROCESS FOR PRODUCING SAME

[75] Inventors: Roger N. Rothon, Chester; Thomas A. Ryan, Kelsall; Phillip J. Tavener, Lancs, all of England

[73] Assignee: Imperial Chemical Industries PLC, London, England

[21] Appl. No.: 453,201

[22] Filed: Dec. 26, 1989

Related U.S. Application Data

[63] Continuation of Ser. No. 205,752, Jun. 13, 1988, abandoned.

[30] Foreign Application Priority Data

Jun. 11, 1987 [GB] United Kingdom ............... 8713693

[51] Int. Cl.$^5$ ........................ C08K 9/04; C08K 9/10
[52] U.S. Cl. ................................ 523/205; 523/209; 427/213.3; 427/213.32; 525/936; 428/331
[58] Field of Search ............... 428/331; 523/205, 209; 427/213.31, 213.32; 525/936

[56] References Cited

U.S. PATENT DOCUMENTS 4,251,576 2/1981 Osborn et al. ................. 428/331
4,695,503 9/1987 Liu et al. ......................... 428/331

Primary Examiner—Merrell C. Cashion, Jr.
Assistant Examiner—Carlos Azpuru
Attorney, Agent, or Firm—Cushman, Darby & Cushman

[57] ABSTRACT

A cohesive polymer comprising a matrix a matrix polymer and a coated particulate filler dispersed therein, characterized in that the matrix polymer is an acrylic polymer, and the filler is coated at least in part with a composition comprising an organic coating polymer of number average molecular weight of up to 300,000, which contains an acidic group (or precursor thereof) and an unsaturated group optionally linked to the matrix acrylic polymer, and a process for its production, and precursors thereof for use in the process.

10 Claims, No Drawings

FILLED COHESIVE POLYMER MATRICES AND PROCESS FOR PRODUCING SAME

This is a continuation of application U.S. Ser. No. 07/205,752, filed June 13, 1988, which was abandoned upon the filing thereof.

This invention relates to filled cohesive polymer matrices and a process for their production.

It is known to modify the properties of a variety of organic polymers by incorporating into such polymers or mixtures thereof one or more inorganic fillers to enhance at least some of the physical properties of the polymer, for example the tensile strength or resistance to wear.

It is also known to enhance some of the interactive physical properties between a filler and the polymer matrix or precursor thereof in which it is used, and in turn to enhance the processability of the filler-precursor mixture or the properties of the filled matrix, which depend on such interactive properties. Thus, to improve the dispersibility of the filler in the matrix, or enhance tensile strength and wear resistance of a filled polymer matrix inter alia, it is desirable to make such fillers and their matrix polymers as mutually compatible as possible and in the latter case to try to optimise filler-polymer bonding. This may be achieved by coating the filler with a material having good filler-coating bonding and to surround it with a matrix having particularly good coating-matrix bonding.

However, in some polymer systems such physical properties may be enhanced at the expense of others, including e.g. some affecting the appearance of the filled polymer matrix, for example a susceptibility to deleterious effects from hot water, including the occurrence of commercially unacceptable hot water whitening. Suprisingly we have now found that this problem can be overcome by using a specific class of filler coating polymers in such filled polymer systems.

Accordingly, in a first aspect the present invention provides a cohesive polymer matrix comprising a matrix polymer and a coated particulate filler dispersed therein, characterized in that the matrix polymer is an acrylic polymer, and the filler is coated at least in part with a composition comprising an organic coating polymer of number average molecular weight of up to 300,000, which contains an acidic group (or precursor thereof) and an unsaturated group optionally linked to the matrix acrylic polymer.

The polymer matrix may comprise more than one acrylic polymer or oligomer (see definition of polymer below), at least one other polymer, oligomer or monomer, and/or more than one particulate filler provided that at least one such filler is coated as described hereinbefore.

Preferably the (or each) filler is inorganic and finely particulate. The coating composition may contain more than one coating polymer as hereinbefore defined.

By the term "acrylic" herein is meant a polymer as hereinafter defined which is derived from monomer units or which comprises units which are substituted —C=C—CO moieties. The term thus includes polymers with polyacrylic backbones and polymers with other backbones in which acrylic groups, such as methacrylyl or methacrylylalkyl groups, cap hydroxy or amino functions.

Within the scope of the term "polymer" in the expressions hereinbefore are included polycondensates oligomers and oligocondensates. Indeed the molecular weight of such an oligomer may be as low as 200 and sufficiently low that the 'polymer' is a non-particulate fluid such as a liquid.

Any of the (or each) matrix polymer and the or each coating polymer may be liquid or solid, and the matrix may thus comprise a fluid or solid solution, dispersion or suspension of one polymer in another and/or in a monomer. The matrix polymer (or mixture of such polymers) and/or any monomer tends to be in large excess over the coating polymer (as further described hereinafter), and accordingly, where it is a fluid, it tends to be the solvent or dispersant phase in a matrix composition.

It will be seen from the foregoing that the form of the matrix may vary widely within the scope of the present invention. It may be a fully cross-linked, generally solid matrix. Also within the scope are included all matrices convertible to others, for example by cross-linking and/or polymerization. These include non-cross-linked, generally solid, polymer matrices, and fluid mixtures (as described above) of polymer(s) and/or oligomer(s). All such precursor matrices form one embodiment of the first aspect of the present invention.

Such matrices which are fluid (especially at ambient temperatures) and comprise a monomer are of specific interest, since it is often such precursors which are used or generated in the production process for the final filled polymer matrices of the present invention (described further below). Such matrices where the monomer is an acrylic monomer corresponding to the acrylic polymer are of interest.

Thus the present invention in one embodiment of its first aspect provides a precursor composition for the production of a filled cohesive acrylic polymer matrix which composition comprises a dispersion of a filler and a dispersion and/or solution of a coating composition as hereinbefore defined in a matrix of an oligomeric precursor and a monomeric precursor of that acrylic polymer.

Within the scope of the term "precursor of an acidic group", are included all groups convertible to free acid groups (in particular under the coating and matrix processing conditions described hereinafter), for example salts, anhydrides and imides in particular such precursors of carboxylic acid and diacid functions.

The use of the particular present coating compositions and polymers in the present acrylic polymer matrices confers particularly good physical properties on, or enhances particularly well the physical properties of, such coated fillers and solid filled matrices, whilst retaining good resistance to hot water (e.g. good matrix appearance after contact with hot water with negligible whitening).

In the particular present matrices the matrix and their precursor polymer(s) and coating polymers have good mutual compatibility and preferably should be capable of mutual cross-linking or be mutually cross-linked e.g. via unsaturated (especially e.g. olefinic or acrylic) groups to enhance coating-matrix and hence filler-matrix binding. Most conventional acrylic polymers or their precursors (of widely varying chemical constitution) are believed and/or appear to have particularly good compatibility with and/or ability to cross-link to the present coating polymers or compositions described further below.

If the matrix contains any matrix polymer or oligomer other than the acrylic polymer(s), this material should of course be compatible with the other components of the matrix, such as the acrylic polymer and the coating polymer, and preferably be capable of cross-linking or be cross-linked to such polymer components.

Similarly, the present coating polymers, and hence matrix polymers, appear to have not only the necessary compatibility with different filler materials, but are versatile with a wide range of such materials including inter alia amphoteric, basic and siliceous particulate fillers.

Within the above general guidelines and those given hereafter suitable matrix polymers and particulate fillers may be established by routine trial.

Within acrylic polymers as defined hereinbefore, the or each matrix polymer may be a homopolymer or any type of copolymer (e.g. random, block or graft). It may be cross-linked or not and may be formed from a precursor which itself contains or does not contain cross-linking functions. Each solid matrix may be a thermosetting or thermoplastic matrix.

Particularly useful matrix polymers appear to include polymers and oligomers based on acrylics such as acrylic and methacrylic acids and esters thereof containing from 4 to 18 carbon atoms, such as $C_{1-8}$ alkyl esters, e.g. methyl methacrylate, butyl methacrylate, propyl methacrylate, ethyl acrylate, butyl acrylate and 2-ethylhexyl acrylate, in particular $C_{1-6}$ alkyl esters, such as methyl methacrylate. Such polymers include homopolymers and -oligomers, and copolymers and -oligomers with other species including: acrylic species such as (meth)acrylonitrile; and non-acrylic species, such as: vinylics, including vinyl aromatic compounds such as styrene, vinyltoluene and divinylbenzene, optionally mixed with maleic acid derivatives, and vinyl acetate, vinyl ethers and vinyl chloride; olefinics, e.g. allyl ethers and esters; and dienes, e.g. butadiene.

Within this type of acrylic polymer, copolymers with non-acrylic comonomers are much less preferred.

Other matrix acrylic polymers include those with polyurethane or polyurea backbones and in which terminal and/or pendent hydroxy or amino functions are capped by acrylic or methacrylic acid monomer units. Suitable polyurethanes include the reaction products of any of ethylene-, diethylene-, tetramethylene-, hexamethylene-, tetramethylethylene-, neopentyl-, and p-xylylene-glycol, and trimethylolpropane, glycerol, and 1,2,6-hexane-triol; and 2,4- and 2,6-tolylene-diisocyanate and 4,4'-diisocyanatodiphenylmethane. Suitable polyureas include the reaction products of ethylene- or hexamethylene-diamine with any of the foregoing polyisocyanates.

Especially useful are matrix polymers which are internally cross-linkable and/or cross-linked, or are linkable and/or linked to the coating polymer and hence to the filler surface. Such linking is typically via an unsaturated group, generally a plurality of such groups, e.g. via one or more acrylic or non-acrylic unsaturated groups. The coating polymer (described hereinafter) appears to bond well to polymers of this type. Thus, for example, the polymers based on acrylic monomers may be copolymers comprising a polyfunctional comonomer, such as polymers and copolymers derived from one or more diacrylates, e.g. ethylene glycol dimethacrylate, giving rise to at least one pendent acrylic linking function.

Similarly, the capping groups in the foregoing polyurethanes and polyureas provide linking functions. Where the matrix comprise a mixture of different polymers, one species may serve to cross-link another, e.g. a capped polyurethane may cross-link a polymer with an acrylic backbone.

Such cross-linkable or cross-linked monomer units may be present as up to 30% by weight of the total acrylic content (polymer and optional monomer—see next paragraph) of the matrix composition, e.g. as 1 to 5% w/w.

Acrylic polymers of particular interest in a precursor matrix as hereinbefore described are oligomers comprising a polyacrylic backbone which are precursors for similar polymers. Where the precursor matrix is fluid, these oligomers will often be dispersed and/or dissolved in a corresponding acrylic monomer as a vehicle; in particular $C_{1-6}$ alkyl esters, such as methyl methacrylate and their oligomers are of interest. However, other oligomers or other monomers (optionally as a vehicle for oligomers) may be used in the same matrix if desired. For example an oligomeric or monomeric precursor may be used which contains or is a different acrylic moiety optionally with other non-acrylic functions, or does not contain any acrylic function but contains or is a non-acrylic moiety. Suitable other acrylic monomer moieties of this type include cross-linking moieties such as glycol dimethacrylate, and suitable non-acrylic moieties include the foregoing polyurethanes and polyureas and their corresponding monomeric functions.

Often all the components in the precursor matrix are compatible, e.g. phase separation does not occur, and the monomer species will react with the oligomer species in the formation of the matrix. However, the monomer species may be incompatible with and/or chemically inert towards any oligomer species, and in particular any acrylic monomer species may be so, relative to an acrylic or non-acrylic oligomer species dispersed therein. Thus a glassy acrylic matrix may be modified by a dispersed rubber, in a manner well-known in the composites art.

The coating polymer within the filled matrix of the first aspect of the present invention is often one with a number average molecular weight in the range 200 to 50,000 for example in the range 500 to 15,000. These materials tend to be liquids (albeit viscous) at room temperature. However, within the scope of the present invention the coating polymers may vary widely in chemical and physical properties Within the above ranges the dispersibility of any coating polymer as a neat liquid, a solution or particles in the matrix or its precursor under the conditions of matrix formation (described hereinafter) or filler coating (conventional) should be sufficient for it to cover the filler surface adequately and evenly to the desired extent and the molecular weight should not be so high as to make the process matrix intractably viscous. This parameter will clearly tend to indicate to the skilled man preferred coating polymers within the favoured matrix polymers mentioned hereinbefore.

(All the foregoing molecular weights include the acid/precursor groups and unsaturated groups within the coating polymer, and weight percentages of such groups hereinafter are based on the weight of the total polymer including such groups).

The coating polymer contains a plurality of unsaturated groups. The unsaturated groups are preferably olefinic. The coating polymer is capable of reacting, or has reacted, with a cross-linkable matrix polymer or its precursor, for example by free-radical cross-linking with a cross linkable matrix polymer or its precursor which also contains olefinic unsaturation, generally vinylic or acrylic. The coating polymer is preferably linked to the matrix polymer groups.

Olefinic groups may be present as part of a structure which is the product of diene polymerisation; examples of such structures include polymers and copolymers derived from one or more dienes, of which the most conveniently available is butadiene, although others may be used if desired (for example isoprene, chloroprene and 1,5-cyclooctadiene and mixtures thereof). Examples of other compounds which may be copolymerised with the diene or dienes includes a wide range of vinylic monomers, e.g. styrene, and acrylics, e.g. acrylonitrile, and mixtures thereof.

If the comonomer comprises a plurality of relevant unsaturated groups, e.g. vinylic, such as in divinylbenzene, these will give rise to further linkable or linked unsaturated groups in the coating polymer. From the foregoing it will be seen the unsaturated groups may also be acrylic.

Unsaturation may also be present in a capping group in the coating polymer. For example some of the acidic groups or their precursors may be esterified with a suitably unsaturated alcohol derivative, e.g. any feasible hydroxy derivative of the monomers of the matrix polymer mentioned hereinbefore, such as hydroxethyl methacrylate.

The probability and extent of coating matrix bonding is of course increased in precursor matrices as hereinbefore described where both the coating and matrix polymers or their precursors have linkable unsaturation, and/or by maximizing the weight percentage of cross-linking e.g. olefinic (including polymer-chain and vinylic olefinic groups) or acrylic groups in each polymer, commensurate with the relative proportion of matrix to coating polymer.

A preferred concentration of any unsaturated binding groups in the coating polymer is at least one such group per 800 total polymer molecular weight, preferably at least 5% w/w of the polymer, in particular at least 10% w/w.

Suitable acidic groups within the coating polymer include carboxylic acid and diacid groups. Precursors of the acidic group(s) in which active hydrogen is reversibly removed are preferred over the acidic groups.

Suitable anhydrides and imides include $\alpha.\beta$-dicarboxylic anhydrides and imides, as terminal or non-terminal functions, such as those derived from maelic anhydride or imide, not least because of the generally good compatibility of the relevant coating polymer with, and/or its solubility in, acrylic polymers and their precursors.

The desirability of good filler-coating and coating-matrix bonding in e.g. enhancing tensile strength and wear resistance of the polymer matrix has been referred to above. The present coating polymer appears to bind well to conventional fillers. The general mechanism is not clear, but, without prejudice to the invention in general, in the case of a basic filler the coating polymer is believed to chemically bond to the surface of a basic filler within the matrix by reaction of the acidic group with the surface.

A preferred concentration of any acidic group or any precursor thereof in the coating polymer is at least one such group per 800 total polymer molecular weight, preferably at least 5 weight %, in particular at least 10 weight % of the polymer.

The foregoing coating polymers belong to a known class of materials.

Most of the matrix polymers or precursors mentioned hereinbefore may also be use as an additional coating composition component.

It will be appreciated from the foregoing that precursor coating polymers which contain an unreacted unsaturated group (and which are thus still capable of cross-linking and/or linking to a matrix polymer) are of specific interest, since it is often such precursors which are used in the production process for the filled matrices of the present invention (described further below).

Such precursor coating compositions may contain additives appropriate to the matrix formation reaction, generally as up to 5 weight % each of the total composition e.g. an antioxidant, or a free radical initiator at the point of, or during, use in the present process to promote good intra-coating, coating-matrix and/or intra-matrix linking.

Often, however, the coating composition will consist essentially of the coating polymer.

In the matrices of the present invention the proportions of matrix polymer to filler to coating polymer may vary, and may be optimised to give desired physical properties by routine trial. Where the filler is coated before incorporation into the matrix (see description of the process hereinafter) it is believed that the proportion of coating to filler in the matrix is unchanged, (i.e. by virtue of the constitution of the coated filler particles being unchanged). Where the coating polymer and uncoated filler are incorporated separately into the matrix (see process description hereinafter) it is unclear what proportions of coating polymer are eventually present as a filler coating and as 'free' polymer in the product matrix, since the proportion of filler to free coating polymer is modified during manufacture by binding of some of the free polymer to the filler surface. By no means all of the free polymer necessarily disappears in this way; indeed, higher proportions of coating polymer are generally used in these circumstances to ensure adequate filler coating.

For these reasons the matrix composition is best described in terms of matrix polymer or precursor: filler: coating polymer proportions and these may vary widely within the scope of the present invention, inter alia with the density and specific surface area of the filler. The following figures for each component of the matrix of course also apply in respect of any precursors of that component, and where any component is itself a mixture e.g. a mixture of matrix polymers and/or any precursors thereof. That is, the figures apply equally to fluid matrices comprising a mixture of oligomer(s) in monomer(s) as to the corresponding polymerised and/or cross-linked, generally solid, product derived therefrom.

The proportion of the total matrix of matrix polymer may be as low as 15%, that of the filler may be 0.15 to 85%, and of the coating polymer up to 50%, all percentages being by weight.

Within the above ranges the dispersibility of the filler in the matrix polymer and/or the coating polymer under the conditions of matrix formation (described hereinafter) should be sufficient for them to cover the filler surface adequately and evenly. This parameter will clearly indicate to the skilled man preferred proportions for given materials.

For a filler of relative density of about 2, and a specific surface area of about 3 $m^2 gm^{-1}$, favored proportions are 20 to 98% matrix polymer, 1.5 to 80%, filler and 0.5 to 15% coating polymer; favored proportions for the other particle parameters will vary in a manner evident to the skilled person.

The matrix and any precursor thereof may also contain a conventional anti-oxidant, suitably as up to 5 weight % of the matrix, and other conventional additives, for example plasticisers, pigments and antiozonants.

Any particular filler may be used in the present invention provided that the filler is stable in the matrix polymer or a precursor thereof, and under any processing conditions, in particular under any filler heating or coating, or matrix formation, conditions; it is however preferred that the filler is capable of binding to or adsorbing the coating polymer. The filler should of course desirably be insoluble in water.

Suitable fillers include amphoteric, basic and siliceous fillers.

The filler may e.g. be amphoteric, e.g. an oxide of this type. Suitable such fillers include oxides and hydroxides of aluminium, including hydrated alumina. Such fillers may be of natural or synthetic origin.

The filler, if basic, may be for example an oxide, a hydroxide, a carbonate or a basic carbonate. Suitable fillers include oxides, hydroxides, carbonate and basic carbonates of alkaline earth metals and of zinc. Preferred such fillers are the carbonates, and magnesium hydroxide. Such filler particles may be of natural or synthetic origin. For example, calcium carbonate may be in the form of ground chalk or produced in the form of a precipitated calcium carbonate, for example calcium carbonate prepared by carbonation of milk of lime.

Suitable siliceous materials may be natural or synthetic Siliceous filler particles may consist of substantially pure silica, for example sands, quartzes or cristobalites or precitipated or fused silica, or may contain silica together with a proportion of one or more other metal oxides, for example acidic oxides, e.g. citania, or metal oxides capable of forming silicates, e.g. calcium, magnesium, aluminium and combinations of these. They may consist of a silicate, provided the silicate is one which is suitable for use as a filler, for example if it is insoluble in water. Suitable silicates include clays and talcs which can be produced in a sufficiently finely divided form to serve as fillers.

The filler may comprise a silicate, for example it may be a silicate coated alkaline earth metal carbonate as described in U.S. Pat. No. 4,373,178.

It is less preferred that the siliceous particles consist predominantly of silica and especially less preferred that they consist of substantially pure silica itself.

Mixtures of all the foregoing particulate fillers may be used.

The filler particles for use in the invention may have any form suitable for a filler, and may have a wide variety of particle shapes and sizes. For example, they may be of irregular, fibrillar or laminar form. Most conveniently the particulate filler is a free-flowing finely-divided powder, as usually commercially available.

Most commonly the filler particles will have a size in the range of 0.1 micron to 1 mm, though we prefer on account of the good reinforcing effect and high filler loading that is possible, that the particle size is in the range of 0.05 to 200 micron, e.g. 0.05 to 100 micron. Typically the particles will have a specific surface area of 0.1 to 250 $m^2g^{-1}$.

For higher filler loadings the particles may be a mixture of two sets of particles with two widely differing mean sizes such that one set of particles can fit in the interstices of the other within the matrix.

In a second aspect the present invention provides a process for the production of a filled cohesive acrylic polymer matrix which process comprises intimately mixing a matrix acrylic polymer or a precursor thereof with (a) a filler and a coating composition or precursor thereof as defined, or (b) a filler coated with a coating composition or precursor thereof, and thereafter as necessary converting any acrylic polymer precursor in the mixture to an acrylic polymer matrix.

Variant (a) is preferred.

A mixture of matrix polymers and/or precursors may of course be used. Precursors of the matrix polymers and/or composition are preferred, as discussed further below.

The mixing step in either process variant may be carried out by conventionally blending the matrix polymer or precursor with the coated filler or with the coating polymer or precursor and the filler, for example by milling e.g. using a ball-mill or multi-roll mill or high-shear mixing or mixing in a planetary vacuum mixer.

Where any linking reactions are in the second process (conversion) step and involve any matrix polymer, they are part of a conventional matrix curing process. This may be effected conventionally, e.g. by heating to set a thermosetting polymer or its precursor, or by heating, processing and cooling for a thermoplastic. Radiation curing may also be used.

It may be helpful to apply some heat, in either process step. However, mixing is often carried out at ambient temperatures, and any heat often only applied in the subsequent curing step, where it is often desirable to apply it to promote linking reactions. Suitable curing reaction temperatures may vary over a wide range below that which is deleterious to any component, but will typically be in the range of 15° to 300° C. Cold cures may be effected at non-elevated temperatures, for example ambient.

Process times are typically in the range 10 minutes to 6 hours. Ambient pressure is suitable.

The process may be carried out in the presence of protecting agents, e.g. antioxidants, and/or in an inert atmosphere, e.g. nitrogen, argon or solvent vapour, if it is desired to guard against deterioration of the polymer during any heating that may be necessary, and with conventional additives (e.g. processing aids), such as mentioned hereinbefore as optional components of the coating composition precursor or the matrix precursor (e.g. for linking reactions), which may be incorporated in either or both, before or during the preparative process.

In preferred process variant (a), not all of the coating polymer of the present invention may coat the filler, but coating in this process variant appears not to be hampered. However, it may be desirable to use an excess of coating polymer/composition over that theoretically needed to coat the filler alone to the desired extent.

The coated fillers for use in variant (b) belong to a known class of such fillers and may be prepared by known methods. Preferably they are coated with a proportion of coating polymer/composition or precursor thereof which produces a matrix composition within the ranges mentioned hereinbefore.

Each filler particle will often be on average at least 40% coated, for example in the case of particles with an average size in the range 0.05 to 100 micron, and this is preferred on account of the good reinforcing effect on the matrix of a filler coated to this extent. However less coated particles may be acceptable, for example at least 15% favourably at least 30% coated.

In both process variants of course the process components are generally a continuous or particulate fluid, and there must also be sufficient of one or more matrix polymers or precursors to flow and mix with, and fully enclose the filler particles and ensure good dispersion of the filler through the product matrix. Suitable proportions within the ranges given hereinbefore can be determined by simple trial and are not necessarily critical.

Matrix precursors which are a continuous fluid (especially at ambient temperatures) are especially suitable in the production process for the final filled matrices. Preferred matrices include those which comprise an oligomeric acrylic polymer precursor and a monomer or monomer mixture wherein the monomer and/or the oligomer acts as a vehicle (solvent or dispersant) for the coating composition, to assist its spread over the filler (especially when the coating represents a low proportion of the matrix and/or the coated filler).

The monomer may often also act as a vehicle for the oligomer. The monomer will of course generally polymerize to form a polymeric component of the final matrix.

Such matrices where the monomer is an acrylic monomer, and especially where it corresponds to the acrylic oligomer are particularly preferred, e.g. methacrylic acid and esters thereof, such as the $C_{1-6}$ alkyl esters mentioned hereinbefore.

The monomer may however be, or a monomer mixture may comprise, a non-acrylic species, and similarly the matrix may contain a non-acrylic oligomer, provided that preferably all the components in the precursor matrix are compatible, e.g. phase separation does not occur. Suitable other acrylic monomer moieties include cross-linking moieties such as glycol dimethacrylate, and suitable non-acrylic moieties include the polyurethanes and polyureas mentioned hereinbefore and their corresponding monomeric functions.

A monomer which is itself a precursor to the (or an) oligomeric matrix polymer precursor may alternatively be used in place of the same oligomer in the present process.

Thus, the present invention in a third aspect provides a precursor composition for the production of a filled cohesive acrylic polymer matrix which composition comprises a dispersion of a filler and a dispersion and/or solution of a coating composition as hereinbefore defined in a matrix of an acrylic monomer.

Additionally or alternatively to all the foregoing reactive vehicles, a non-reactive vehicle may be used.

Any such vehicle will be chemically inert and should preferably be of low flammability and low toxicity, and, where the desired product matrix is a solid, a low boiling point will tend to be significant in the subsequent necessary removal of the vehicle from the mixture.

Examples of organic vehicles which are suitable include hydrocarbons, for example aliphatic, aromatic, araliphatic or cycloaliphatic hydrocarbons, e.g. toluene, xylene and petroleum fractions; halogenated and especially chlorinated hydrocarbons, e.g. methylene chloride, chloroform, carbon tetrachloride, 1,2-dichloroethane, trichloroethylene and tetrachloroethylene; ethers, for example diethyl ether- and mixtures thereof.

The desired polymer matrix may be a fluid, such as a sealant or high-build surface coating, in which the matrix polymer is a solution, or emulsion or other dispersion in a vehicle. In such a case the processing vehicle may be retained as a vehicle for the final product.

Suitable conventional vehicles and their proportions in the process (and optionally in the desired product) will be well-known to the skilled man, or can be readily determined by simple trial.

The coating polymer or its precursor is often conveniently liquid (even if a viscous liquid) at ambient temperatures or in the form of a free flowing powder with a melting point range within the range of 20° to 230°, more conveniently 20° to 130° C. The convenience of such properties in coating the filler for use in process variant (b) or in variant (a) will be readily appreciated. It is of course particularly preferred in process variant (a) that the coating polymer and any other coating composition components are soluble in any vehicle.

Matrix cross-linking, matrix-coating linking, coating cross-linking, and or coating filler linking reactions may be incorporated in either or both steps. Cross linking or linking reactions may involve the matrix polymer(s) or precursor(s), the coating polymer of the invention, and any other polymer in the coating, and may be optimised by routine trial to optimise the desired physical properties of the product.

Linking of types above may take place separately or concurrently when any of the foregoing polymers/precursors are of the preferred types mentioned hereinbefore, but is generally incorporated in the second process step.

The filler and the coating polymer are preferably capable of good mutual bonding. A basic filler and coating polymer which comprises at least one terminal or non-terminal cyclic anhydride or imide group (in particular a carboxylic such group) as an acidic group precursor are amongst preferred filler-coating combinations.

Where a basic filler is coated by a coating composition comprising a polymer containing an acidic group precursor group, it is desirable to convert that precursor group to the acidic group, so that the filler is coated at least in part with coating polymer which is bound to the filler surface. This is conveniently effected in situ in the matrix formation/coating process by incorporating a converting reagent in the process. Thus, for example, where the precursor is an anhydride, a suitable reagent is water, either as reactable water within the filler itself or within any vehicle used.

We have found that the coating composition or precursor used in the present invention acts as a good dispersant for filler particles in matrices of acrylic polymers or their precursors, and accordingly in a fourth aspect the invention provides the use of such coating compositions as dispersants for fillers in such matrices.

The preparation of filled polymer matrices of the present invention is illustrated by the following Examples. The preparation of coating polymer materials is illustrated by the following Description. All parts and percentages are by weight.

DESCRIPTION

Preparation of Organic Coating Polymer MPBD (Maleinised Polybutadiene)

Maleinised polybutadiene was prepared by the reaction of polybutadiene (100 parts) with maleic anhydride at 180°–190° for six hours under a nitrogen atmosphere and in the presence of an antioxidant. Depending primarily on the molecular weight of the initial butadiene, the product may be a viscous liquid or a solid. The following were so prepared:

| MPBD(1): | butadiene Mn 800, | anhydride 20% |
|---|---|---|
| MPBD(2): | butadiene Mn 1300, | anhydride 10% |
| MPBD(3): | butadiene Mn 1300, | anhydride 20% |
| MPBD(4): | butadiene Mn 2600, | anhydride 20% |
| MPBD(5): | butadiene Mn 5000, | anhydride 20% |
| MPBD(6): | butadiene Mn 8000, | anhydride 4.8% |
| MPBD(7) | butadiene Mn 8000, | anhydride 9.1% |

EXAMPLE 1

Fluid precursor matrices of the present invention of compositions corresponding to those following Example 2 below were prepared by dissolving a maleinised polybutadiene in a mixture of methyl methacrylate and ethylene glycol dimethacrylate, and stirring in filler and optionally a pigment for 1 or 2 min. On a laboratory scale this was carried out with a spatula; in production a high-shear mixer is used.

EXAMPLE 2

Solid matrices of the present invention (some crosslinked) of the following Compositions 1 to 25 were prepared on a laboratory scale from the precursor matrices of Example 1 as follows: The relevant matrix was allowed to stand with occasional shaking for 1 hour, and then a free radical catalyst and stearic acid were added under stirring with a spatula. After standing for a further 30 min with occasional shaking, the slurry was degassed under vacuum for 2 min and then poured into a casting cell. After curing for 30 min in a water bath at 65° and for 30 to 60 min in a water bath or oven at 90° C., a solid plaque was obtained.

In production, the precursor matrix may be used immediately (without standing), the catalyst and stearic acid are added with rolling for 30 min, and the product further processed immediately.

Scanning electron microscopy showed the filler to be well wetted by the polymer matrix

| | | parts |
|---|---|---|
| Composition 1 | | |
| Matrix polymer: | methyl methacrylate (MMA) | 110.2 |
| | ethylene glycol dimethacrylate (EGDMA) | 2.1 |
| Coating composition: | MPBD (3) | 1.93 |
| Other: | Stearic Acid | 0.67 |
| | Catalyst | 2.38 |
| Filler: | calcium carbonate (Snowcal 7 ML) | 200 |
| Composition 2 | | |
| Matrix polymer: | methyl methacrylate (MMA) | 71.3 |
| | ethylene glycol dimethacrylate (EGDMA) | 2.1 |
| Coating composition | MPBD (3) | 3.0 |
| Other: | Stearic acid | 0.67 |
| | Catalyst | 2.38 |
| Filler: | Magnesium carbonate subhydrate (ICI) | 200 |
| Composition 3: | | |
| Matrix polymer | methyl methacrylate (MMA) | 71.3 |
| | ethylene glycol dimethacrylate (EGDMA) | 2.1 |
| Coating Composition | MPBD (3) | 2.9 |
| Other: | Stearic acid | 0.67 |
| | Catalyst | 2.38 |
| Filler: | Magnesium hydroxide (Asahi Glass 200-06) | 200 |
| Composition 4 | | |
| Matrix polymer: | methyl methacrylate (MMA) | 71.3 |
| | ethylene glycol dimethacrylate (EGDMA) | 2.1 |
| Coating composition | MPBD (3) | 2.9 |
| Other | Stearic acid | 0.67 |
| | Catalyst | 2.38 |
| Filler: | alumina trihydrate (Baco FRF 80) | 193 |
| Compositions 5A to C | | |
| Matrix polymer: | methyl methacrylate (MMA) | 35 |
| | ethylene glycol dimethacrylate (EGDMA) | 0.3 |
| Other: | Stearic acid | 0.2 |
| | Catalyst | 0.6 |
| Filler: | alumina trihydrate (Baco FRF 80) | 63 |
| Coating composition | MPBD (1) respectively | 0.5 |
| | | 2.0 |
| | | 3.0 |
| Composition 6: | | |
| Matrix polymer | methyl methacrylate (MMA) | 35 |
| | ethylene glycol dimethacrylate (EGDMA) | 0.3 |
| Other: | Stearic acid | 0.2 |
| | Catalyst | 0.6 |
| Filler:L | alumina trihydrate (Baco FRF 80) | 63 |
| Coating composition | MPBD (2) | 0.5 |
| Compositions 7A to C | | |
| Matrix polymer: | methyl methacrylate (MMA) | 35 |
| | ethylene glycol dimethacrylate (EGDMA) | 0.3 |
| Other | Stearic acid | 0.2 |
| | Catalyst | 0.6 |
| Filler: | alumina trihydrate (Baco FRF 80) | 63 |
| Coating composition | MPBD (3) respectively | 0.5 |
| | | 2.0 |
| | | 3.0 |
| Composition 8 | | |
| Matrix polymer: | methyl methacrylate (MMA) | 35 |
| | ethylene glycol dimethacrylate (EGDMA) | 0.3 |
| Other: | Stearic acid | 0.2 |
| | Catalyst | 0.6 |
| Filler: | alumina trihydrate (Baco FRF 80) | 63 |
| Coating composition | MPBD (4) | 0.5 |
| Composition 9 | | |
| Matrix polymer: | methyl methacrylate (MMA) | 35 |
| | ethylene glycol dimethacrylate (EGDMA) | 0.3 |
| Other: | Stearic acid | 0.2 |
| | Catalyst | 0.6 |
| Filler: | alumina trihydrate (Baco FRF 80) | 63 |
| Coating composition | MPBD (5) | 0.5 |
| Composition 10 | | |
| Matrix polymer: | methyl methacrylate (MMA) | 35 |

| | | parts |
|---|---|---|
| | ethylene glycol dimethacrylate (EGDMA) | 0.3 |
| Other: | Stearic acid | 0.2 |
| | Catalyst | 0.6 |
| Filler: | alumina trihydrate (Baco FRF 80) | 63 |
| Coating composition | MPBD (6) | 0.5 |

Composition 11

| | | parts |
|---|---|---|
| Matrix polymer: | methyl methacrylate (MMA) | 35 |
| | ethylene glycol dimethacrylate (EGDMA) | 0.3 |
| Other: | Stearic Acid | 0.2 |
| | Catalyst | 0.6 |
| Filler: | alumina trihydrate (Baco FRF 80) | 63 |
| Coating composition | MPBD (7) | 0.5 |

Composition 12

| | | parts |
|---|---|---|
| Matrix polymer: | methyl methacrylate (MMA) | 35 |
| | ethylene glycol dimethacrylate (EGDMA) | 0.3 |
| Other | Stearic acid | 0.2 |
| | Catalyst | 0.6 |
| Filler: | calcium sulphate | 63 |
| Coating composition | MPBD (3) | 1.0 |

Composition 13

| | | parts |
|---|---|---|
| Matrix polymer: | methyl methacrylate (MMA) | 35 |
| | ethylene glycol dimethacrylate (EGDMA) | 0.3 |
| Other: | Stearic acid | 0.2 |
| | Catalyst | 0.6 |
| Filler: | molecular seives (BDH 4A powder) | 63 |
| Coating composition | MPBD (3) | 0.5 |

Composition 14

| | | parts |
|---|---|---|
| Matrix polymer: | methyl methacrylate (MMA) | 35 |
| | ethylene glycol dimethacrylate (EGDMA) | 0.3 |
| Other: | Stearic acid | 0.2 |
| | Catalyst | 0.6 |
| Filler: | calcium carbonate (Calofort U, Sturge) | 23 |
| Coating composition | MPBD (3) | 5.6 |

Composition 15

| | | parts |
|---|---|---|
| Matrix polymer: | methyl methacrylate (MMA) | 35 |
| | ethylene glycol dimethacrylate (EGDMA) | 0.3 |
| Other: | Stearic acid | 0.2 |
| | Catalyst | 0.6 |
| Filler: | barium sulphate (Microbar 139, Microfine Ltd) | 63 |
| Coating composition | MPBD (3) | 0.8 |

Composition 16

| | | parts |
|---|---|---|
| Matrix polymer: | methyl methacrylate (MMA) | 34 |
| | ethylene glycol dimethacrylate (EGDMA) | 0.7 |
| Coating composition | MPBD (3) | 1.0 |
| Other: | Stearic acid | 0.2 |
| | Catalyst | 0.8 |
| Filler: | calcium carbonate (Snowcal 7 ML) | 63 |

Composition 17

| | | parts |
|---|---|---|
| Matrix polymer: | methyl methacrylate (MMA) | 34 |
| | ethylene glycol dimethacrylate (EGDMA) | 0.7 |
| Coating composition | MPBD (3) | 1.0 |
| Other: | Stearic acid | 0.2 |
| | Catalyst | 0.8 |
| Filler | magnesium carbonate subhydrate (ICI) | 63 |

Composition 18

| | | parts |
|---|---|---|
| Matrix polymer: | methyl methacrylate (MMA) | 34 |
| | ethylene glycol dimethacrylate (EGDMA) | 0.7 |
| Coating composition | MPBD (3) | 1.0 |
| Other: | Stearic acid | 0.2 |
| | Catalyst | 0.8 |
| Filler: | calcium magnesium carbonate subhydrate (Ultracarb U5) | 63 |

Composition 19.

| | | parts |
|---|---|---|
| Matrix polymer | methyl methacrylate (MMA) | 34 |
| | ethylene glycol dimethacrylate (EGDMA) | 0.7 |
| Other: | Stearic acid | 0.2 |
| | Catalyst | 0.8 |
| Filler: | magnesium hydroxide (Asahi Glass 200-06) | 63 |

Composition 20

| | | parts |
|---|---|---|
| Matrix polymer: | methyl methacrylate (MMA) | 40 |
| Other: | Stearic acid | 0.2 |
| | Catalyst | 0.6 |
| Pigment: | iron oxide red (Bayer Bayferrox 120N) | 0.25 |
| Filler: | alumina trihydrate (Baco FRF 60) | 60 |
| Coating composition | MPBD (3) | 0.6 |

Composition 21

| | | parts |
|---|---|---|
| Matrix polymer: | methyl methacrylate (MMA) | 40 |
| Other: | Stearic acid | 0.2 |
| | Catalyst | 0.6 |
| Pigment | Quinacridone violet (Bayer Quindomagenta RV6832) | 0.1 |
| Filler: | alumina trihydrate (Baco FRF 60) | 60 |
| Coating composition | MPBD (3) | 0.6 |

Composition 22

| | | parts |
|---|---|---|
| Matrix polymer: | methyl methacrylate (MMA) | 50 |
| Other: | Catalyst | 0.6 |
| Pigment | iron oxide red (Bayer Bayserrox 120N) | 0.25 |
| Filler: | magnesium hydroxide (Asahi Glass 200-06H) | 50 |
| Coating composition | MPBD (3) | 0.6 |

Composition 23

| | | parts |
|---|---|---|
| Matrix polymer: | methyl methacrylate (MMA) | 50 |
| Other: | Catalyst | 0.6 |
| Pigment: | Quinacridone violet (Bayer Quindomagenta RV 6832) | 0.1 |
| Filler: | magnesium hydroxide (Asahi Glass 200-06H) | 50 |
| Coating composition | MPBD (3) | 0.6 |

Composition 24

| | | parts |
|---|---|---|
| Matrix polymer: | methyl methacrylate (MMA) | 40 |
| Other: | Catalyst | 0.6 |
| Pigment | iron oxide red (Bayer Bayserrox 120N) | 0.25 |
| Filler: | calcium carbonate (Croxton & Garry Britomya M) | 60 |
| Coating composition | MPBD (3) | 0.6 |

Composition 25

| | | parts |
|---|---|---|
| Matrix polymer: | methyl methacrylate (MMA) | 40 |
| Other: | Catalyst | 0.6 |
| Pigment: | Quinacridone violet (Bayer Quindomagenta RV6832) | 0.1 |
| Filler: | calcium carbonate (Croxton & Garry Britomya M) | 60 |
| Coating composition | MPBD (3) | 0.6 |

Composition 26

| | | parts |
|---|---|---|
| Matrix polymer: | methyl methacrylate (MMA) | 50 |
| Other: | Catalyst | 0.6 |
| Pigment: | iron oxide red (Bayer Bayserrox 120N) | 0.25 |
| Filler: | magnesium hydroxide (Asahi Glass 200-06H) | 50 |
| Coating composition | MBPD (3) | 1.2 |

-continued

| | | parts |
|---|---|---|
| Composition 27 | | |
| Matrix polymer: | methyl methacrylate (MMA) | 50 |
| Other: | Catalyst | 0.6 |
| Pigment | Phthalocyanine blue (Bayer) | 0.1 |
| Filler | magnesium hydroxide (Asahi Glass 200-06H) | 50 |
| Coating composition | MPBD (3) | 1.2 |

EXAMPLE 3

All the final solid filled matrices of Example 2 were found to have good appearance, and were tested in accordance with the following procedures:

Flexural stress-strain properties were measured on an instron 4301 according to ISO 178(1975-E)

Impact strength was measured on a Zwick according to ISO 179.

Resistance to hot-water whitening of matrices containing pigments was measured on a Macbeth Colormeter using artificial daylight and in accordance with the manufacturer's instructions.

The values $\Delta L$ (lightening on a black-white scale) and $\Delta E$ (change in colour intensity) were calculated by the method described in the manufacturer's instructions.

These properties are shown in the following Tables

TABLE 1

FILLER AND COATING PERFORMANCE IN THE MATRICES OF EXAMPLE 2

| COMPOSITION | IMPACT STRENGTH $KJm^{-2}$ |
|---|---|
| 1 | 4.2 |
| 2 | 4.2 |
| 3 | 3.8 |
| 4 | 4.0 |
| 5A | 3.75 |
| 5B | 3.57 |
| 5C | 3.67 |
| 6 | 4.3 |
| 7A | 4.4 |
| 7B | 4.0 |
| 7C | 5.2 |
| 8 | 5.2 |
| 9 | 4.3 |
| 10 | 3.1 |
| 11 | 4.2 |
| 12 | 4.0 |
| 13 | 3.7 |
| 14 | 4.0 |
| 15 | 3.7 |
| 16 | 4.2 |
| 17 | 3.8 |
| 18 | 4.1 |
| 19 | 4.0 |

TABLE 2

FILLER PERFORMANCE IN MATRICES OF EXAMPLE 2

| COMPOSITION | FLEX STRENGTH MPa | FLEX MODULUS GPa | IMPACT $KJm^{-2}$ | LIGHTENING $\Delta L$ | COLOUR $\Delta E$ |
|---|---|---|---|---|---|
| 20 | 61 | 10.0 | 3.3 | 0.7 | 1.4 |
| 21 | 76 | 10.8 | 3.7 | 1.3 | 2.4 |
| 22 | 73.4 | 7.8 | 4.5 | 0.9 | 1.3 |
| 23 | 83.6 | 7.2 | 4.5 | 1.8 | 2.5 |
| 24 | 69.0 | 8.3 | 3.5 | 1.1 | 2.3 |
| 25 | 66.3 | 8.4 | 3.6 | 2.3 | 3.3 |
| 26 | 73.4 | 7.8 | 4.5 | 0.9 | 1.3 |
| 27 | 76.9 | 7.6 | 3.9 | 1.3 | 2.4 |

What is claimed is:

1. A cohesive polymer matrix comprising a matrix polymer and a coating particulate filler dispersed therein, characterized in that the matrix polymer is an acrylic polymer, and the filler is coated at least in part with a composition comprising an organic coating polymer of number average molecular weight in the range 500-15,000, which contains an unsaturated group present as part of a structure which is the product of polymerizing one or more dienes and an acidic group for precursor thereof and in that the unsaturated group is either bonded or non-bonded to the matrix acrylic polymer.

2. A matrix according to claim 1, characterized in that the acrylic matrix polymer is essentially a homopolymer or a copolymer of acrylic monomer species.

3. A matrix according to claim 1, characterized in that the matrix polymer is a cross-linked methyl methacrylate-glycol dimethacrylate copolymer.

4. A matrix according to claim 1, characterized in that it comprises 25 to 98% matrix polymer, 1.5 to 75% to 75% filler and 0.1 to 15% coating polymer.

5. A matrix according to claim 1, characterized in that the coating polymer comprises at least 5 weight % of the unsaturated binding groups.

6. A matrix according to claim 1, characterized in that the coating polymer is a substituted polybutadiene.

7. A matrix according to claim 1, characterized in that the coating polymer comprises an $\alpha,\beta$-dicarboxylic cyclic anhydride group or the product of the reaction of the same with the filler surface.

8. A precursor composition for a matrix according to claim 1, characterized in that it comprises a dispersion of a coating composition as defined in claim 1 in a matrix of an acrylic monomer.

9. A process for the production of a filled cohesive acrylic polymer matrix according to claim 1 which process comprises intimately mixing a matrix acrylic polymer or a precursor thereof with
    (a) a filler and a coating composition or precursor thereof as defined in claim 1, or
    (b) a filler coated with a coating composition or precursor thereof, and thereafter as necessary converting any acrylic polymer precursor in the mixture to an acrylic polymer matrix.

10. A cohesive polymer matrix as claimed in claim 1 wherein the matrix is a precursor composition comprising an oligomeric precursor and a monomeric precursor of the acrylic polymer.

* * * * *